Figure 1:
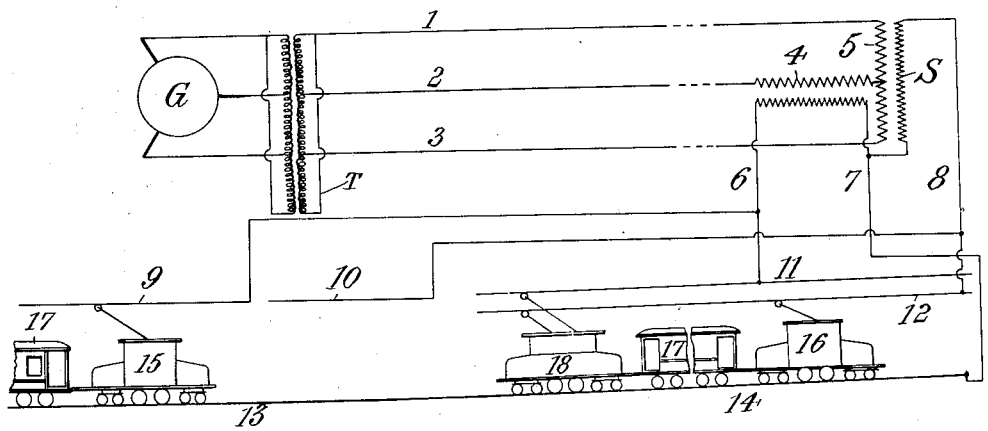

L. B. STILLWELL & F. N. WATERMAN.
ELECTRIC TRACTION SYSTEM.
APPLICATION FILED JAN. 11, 1905.

1,081,342.

Patented Dec. 16, 1913.

3 SHEETS—SHEET 1.

Witnesses

Inventors
Lewis B. Stillwell
Frank N. Waterman
By their Attorneys

L. B. STILLWELL & F. N. WATERMAN.
ELECTRIC TRACTION SYSTEM.
APPLICATION FILED JAN. 11, 1905.

1,081,342.

Patented Dec. 16, 1913.
3 SHEETS—SHEET 2.

Witnesses
Walter A. Pauling
Chas. J. Rathjen

Inventor
Lewis B. Stillwell
Frank N. Waterman
By their Attorneys
Gifford & Bull

UNITED STATES PATENT OFFICE.

LEWIS B. STILLWELL, OF LAKEWOOD, AND FRANK N. WATERMAN, OF SUMMIT, NEW JERSEY.

ELECTRIC TRACTION SYSTEM.

1,081,342.  Specification of Letters Patent.  Patented Dec. 16, 1913.

Application filed January 11, 1905. Serial No. 240,586.

*To all whom it may concern:*

Be it known that we, LEWIS B. STILLWELL, a citizen of the United States, and residing at Lakewood, in the county of Ocean and State of New Jersey, and FRANK N. WATERMAN, a citizen of the United States, and residing at Summit, in the county of Union and State of New Jersey, have invented a new and useful Improvement in Electric Traction Systems, of which the following is a specification.

Our invention relates more particularly to the electric operation of main line railways, and its object is to secure a higher degree of economy in operation.

To this end it consists in the combination of single phase and polyphase equipment as herein described to utilize the advantageous features of each. When the polyphase induction motor is driven above a speed corresponding to a synchronous relation with the generator, for the number of poles for which it is connected, or a concatenated series of induction motors are driven above a speed corresponding to synchronism for the combined number of poles, the motors act as generators absorbing mechanical and returning electric energy. This property enables such machines when employed as railway motors to act to retard a train and restore to the line a considerable percentage of its stored energy. Such motors, moreover, have a higher efficiency with consequent comparative freedom from overheating, can be of more substantial and less delicate construction, can be more securely protected from injury, and are of less weight and cost per horse-power than other types of motors. In addition to these advantages they have substantially uniform torque and, hence give the maximum tractive effort for a given weight on the driving wheels, and permit of the lightest locomotive construction for a given service. Single-phase series commutating motors, on the other hand, being essentially variable-speed motors, possess certain advantages in the acceleration of trains and invariable voltage speed control; but being variable torque motors, they do not as effectively utilize the weight on the driving wheels, and are of comparatively low efficiency, particularly for continued low speed work, such as the climbing of grades. The maximum economy in the operation of trains requires at all times a minimum train weight sufficient for the service. On the other hand, the minimum necessary weight of locomotives is determined by the maximum grades encountered, assuming a constant weight of train, so that on roads having heavy grades locomotives are unnecessarily heavy for service on level portions, and unnecessary power is thus consumed, while the track and bridges are deteriorated by the great weight of the locomotives. The three-phase equipment will pull considerably more per ton on drivers than either steam or single-phase equipment, so that while an excessive weight is required for single-phase locomotives per given tractive effort, polyphase locomotives permit of a reduction of weight as compared with steam equipment. In order to utilize these several features and secure a system in which maximum flexibility and economy are possible, we propose to combine the two kinds of equipment for operation in a single-system. To this end we divide the road to be operated into sections according to gradients and character of service. For service on the level sections of the line, or for such portions of the service as may be desired, we provide single-phase locomotives or motor car trains whose driving wheel weights are proportioned to the requirements of such sections, the trolley circuits of such portions being ordinarily single-phase, while sections of the line having ascending or descending grades are equipped with polyphase contact conductor circuits from which the single-phase equipment will or may also be operated, and polyphase locomotives are provided or polyphase equipment carried on the car to operate in ascending and furnish a means of recuperative braking in descending such grades.

Since the train energy available for recuperation and restoration to the line in descending a grade is less than that required for ascending by twice the energy required to overcome train resistance at the same speed, a polyphase locomotive whose weight and power is sufficient to supplement the locomotive used on the level in ascending a grade, will usually possess a sufficient capacity and tractive effort to control the train on the descent with little or no mechanical braking, thus effecting an important saving in energy and in wear and tear on the brake equipment.

Figure 2:
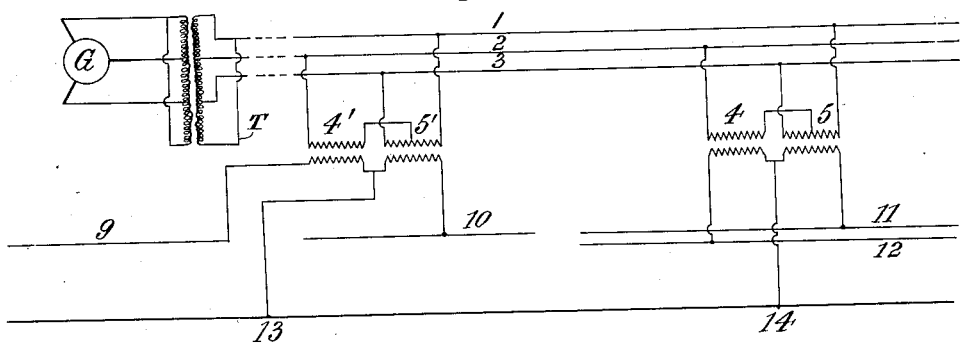
Figure 3:
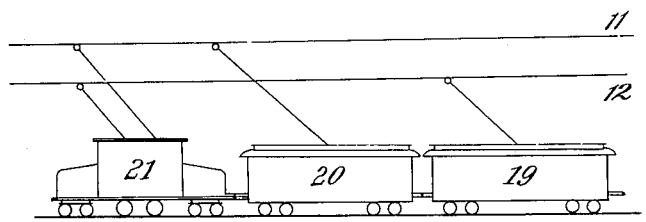
Figure 4:
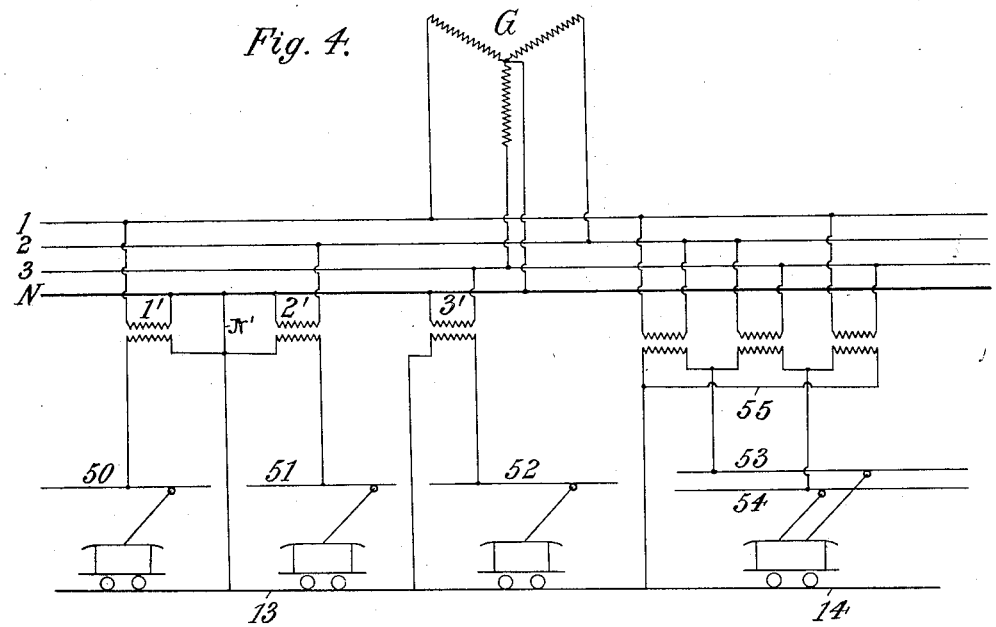
Figure 5:
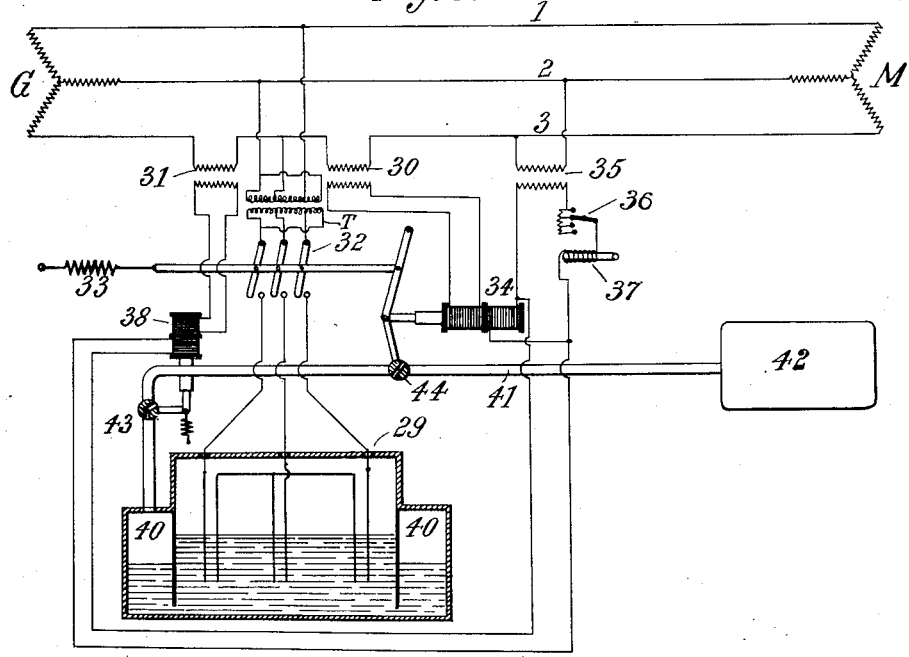
Figure 6:
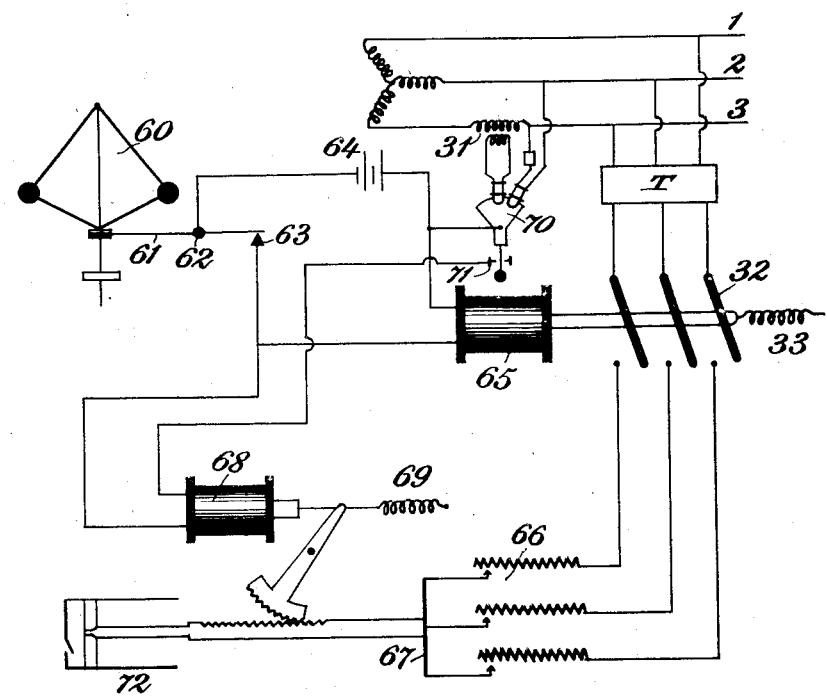

Referring to the drawings, Figure 1 is a diagram illustrating suitable arrangements and connections for carrying out our invention, and Figs. 2, 3 and 4 are modified arrangements for the same purpose. Fig. 5 is a diagram illustrating the connections of an automatic rheostat device. Fig. 6 is a diagram illustrating the connections of another automatic rheostat device.

Similar reference figures indicate the same or corresponding parts in all the figures.

The following is a description of the structures diagrammatically illustrated in the drawings, which show our invention applied in forms at present preferred by us, but it will be understood that various modifications and drawings may be made without departing from the spirit of our invention and without exceeding the scope of our claims Referring to Fig. 1, G typifies a three-phase generating station, supplying high tension current, either directly or through step-up transformers T, to transmitting wires 1, 2 and 3. S indicates a sub-station having transformers 4 and 5 and the usual switching and protecting devices (not shown in the figure). The transformers are so connected and proportioned, in a manner well understood in the art, as to furnish two phase current of the required tension to secondary leads 6, 7 and 8. 13 represents in side elevation the rails of the railway tracks on a level portion of the road, and 14 similarly represents a portion on a grade. Lead 7 being the common wire of the two phase secondary system, is connected to the track, as shown, while leads 6 and 8 are connected to singlephase trolley or contact conductor sections 9 and 10 mounted in suitable relation to the track to furnish current to trains moving thereon. 11 and 12 are two contact conductors corresponding to the portion of the line 14, and are connected respectively to leads 6 and 8 from the sub-station. The single-phase and polyphase sections need not, and in general will not, be supplied from the same sub-stations, but will have separate sub-stations, as indicated in Fig. 2 in which substantially the same circuits are shown. In Fig. 1, 15 indicates a single-phase locomotive on section 9, and 17 the train drawn thereby, 16, 17 and 18 a similar train with a two phase locomotive attached in addition to the single-phase locomotive, 18 being the two-phase locomotive, 17 the drawn train and 16 the single-phase locomotive. It will, of course, be understood that the two-phase locomotive may be at either end of the train. The single-phase locomotive 16, may take current from either contact conductor 11 or 12, while the two phase locomotive 18, receives current from both. Where the single-phase equipment consists of two or more motor units, current collectors may be applied to each of the contact conductors 11 and 12, thus more evenly dividing the load on the generator and rendering substantially uniform the torque of the single-phase equipment, since the pulsations of torque of motor units supplied from conductor 11 will occur in quadrature with those of units supplied from conductor 12. We have indicated such an arrangement in Fig. 3, where 19 and 20 are motor cars of a multiple unit control train and 21 is a polyphase locomotive. It is, of course, obvious that a single-phase locomotive provided with two or more sets of motor units may, by the provision of two current collectors, be similarly operated. In ascending a grade the polyphase locomotive and the single-phase motor car or locomotive are both in operation, the speed of the polyphase locomotive being made that at which it is desired to make the ascent. In descending the single-phase locomotive may be disconnected from the circuit, and by an acceleration of the train of a few per cent. the polyphase locomotive will return energy to the line, and hold the train at a uniform speed.

Instead of employing separate single-phase and polyphase motors or locomotives, it is evident that a motor possessing the capacity of operating with both single-phase and polyphase currents would be the substantial equivalent of the motors described within the spirit of our invention in its broader aspects and within the scope of our claims. This would render unnecessary the employment of a supplemental locomotive on grades supplied with polyphase contact conductors, the same motor being at one time operated with single-phase and at another time with polyphase currents.

The polyphase locomotives are preferably arranged for cascade or concatenated control, whereby two or more economical speeds are obtained for ascending or descending, and the single-phase locomotives or motor cars can advantageously be provided with inductive control apparatus for greater ease in attaining any desired division of load, all as well understood in the art; but neither of these features is essential.

For certain classes of service, particularly express service, where frequent accelerations or reduction of speed are not demanded, polyphase operation has many advantages over single-phase, particularly in the high efficiency of the motors and in the maintenance of speed independently of the load and of the line voltage. For the purpose of a mixed service, therefore, we provide such sections of road with polyphase contact conductors in addition to those parts having grades and operate both single and polyphase motor units therefrom, the single-phase motor units taking power from one or the other of said conductors.

Fig. 4 illustrates a three-phase transmission and railway line with single-phase contact conductor sections connected respectively to the several phases of the three-phase system, and polyphase sections connected for the operation of three-phase locomotives. In this instance a neutral wire is preferably employed for better regulation and division of load on the three-phase generating apparatus and circuits. In this figure G represents a generating station and 1, 2 and 3 the transmission lines, N being the neutral wire. Contact conductor sections 50, 51, and 52 are supplied from transformers 1', 2', 3', connected respectively between conductors 1, 2 and 3, and the neutral wire N. On the polyphase section conductors 53 and 54 are connected to two of the terminals, while the track 14 is connected to the third terminal of a bank of transformers 55, shown in delta-connection, though they may equally well be in Y-connection. It is not, of course, necessary that the polyphase sections should in this case also be connected for three-phase currents, as two phases in quadrature may equally well be used.

The neutral wire N may or may not be grounded by connection to the track as shown at N' in Fig. 4. As shown the track is connected to the neutral wire and to the corresponding secondary points on single phase sections 50, 51 and 52, while on the polyphase section it is connected to one leg of the three phase circuits. This is shown for the purpose of general illustration, and when employed in practice the transformers must be insulated for the additional strains thus produced.

The arrangement of the several single-phase sections illustrated in the figure is shown for single track only, and is to be understood as purely diagrammatic. In double track service, each track may be regarded as part of a different section, as the term is employed in this specification and in our claims and in actual construction the several single-phase circuits will be so arranged on the individual phases as to distribute the load as nearly as possible uniformly with the average division of service required by the timetable. Since, however such division of load can never be perfect, the distribution of load on the generator, will, in general, be unsymmetrical. The polyphase sections, however, will load the generator symmetrically when absorbing power and when returning power will tend to deliver it symmetrically to the several circuits.

In the event of a smaller demand for energy on one phase than is returned by the moving train, such surplus energy would be returned to the generator, thus driving it from one or more phases as a motor and delivering energy over the remaining phases. In such cases a polyphase synchronous motor connected to the polyphase circuit is advantageous, as it acts to a considerable extent at all times as an equalizer of the loads on the phases and the equalization above referred to is often advantageously effected by such a motor rather than through the generator. Such motor may, to a considerable extent, also be employed as a voltage regulator on the system, and thus combine equalizing and regulating features in a manner particularly useful in the system constituting the subject of this invention.

The restoration of energy in the descent of grades demands that there be a minimum consumption of energy by the rest of the system equal to that given out at any time by a train or trains descending, as otherwise a dangerous condition may be produced, since the whole system must speed up until its losses equal the energy being returned. In order to prevent such a result we provide a suitable regulating device which may consist of a variable resistance rheostat, automatically cut into the circuit whenever the energy returned to the line by the moving trains exceeds the losses of the system at the normal frequency, such rheostat, or other power-consuming device, being under the joint control of the line currents on the generator-side and train-side of its point of attachment to the system. Fig. 5 is a diagrammatical illustration of such an arrangement. In this figure G typifies a normal generating source and M the train returning energy to the transmission lines 1, 2, 3. 29 represents, diagrammatically, a rheostat (with or without the interposition of transforming apparatus T) connected to wires 1 and 2, and to wire 3 between two series transformers 30, 31, through a three-pole switch 32, normally held open by a spring 33. This switch is under the control of a suitable reverse current switch, such as the compound magnet 34, one coil of which is connected to the secondary of the transformer 30, while the other is connected in shunt to the circuit 2, 3 either directly or through a transformer 35. The two coils of magnet 34 are so connected that under normal conditions their effects are in opposition and produce no actuating effect upon the switch 32. Since in such a system the current is always lagging and the power factor less than unity, and since the electro-motive forces in the secondaries of transformers 30, 35 are not in phase, suitable adjustable resistance and reactance devices 36 and 37 may be inserted to render the currents in the coils substantially in phase for the average power factor of the system. In the event of an excess of energy returned to the line from the train motor M, the current through transformers 30, 31 will be reversed thus energizing compound magnet 34 and actuating the switch 32, thereby connecting the rheostat 29 to the circuit and providing a means of absorbing the returned energy.

The resistance that the rheostat should have at any moment will depend upon the energy to be absorbed, and it is desirable, therefore, that such rheostat should be automatically adjustable to the load on the system. Various means of accomplishing this result are possible, that indicated in the drawing being the employment of a liquid rheostat, the level of the liquid in which is automatically raised and lowered by air pressure admitted to an annular chamber 40 above the liquid, through a pipe 41, from a source of air pressure 42. Air valves 43 and 44 are provided in the pipe 41, the valve 43 being normally open to the atmosphere and venting the rheostat, and valve 44 normally closing the air supply pipe. The valve 44 is actuated by the compound magnet 34, while valve 43 is actuated by a similar magnet 38, as shown. Upon the closing of the switch 32 the valve 43 is closed to the atmosphere and both valves are opened to the source of air pressure, admitting air under pressure to the rheostat, and causing a progressive rise of the level of the liquid therein until such time as the losses of the system are equal to the energy returned by the moving train. When this point is reached, current will flow from the generator G into the rheostat 29, thus reversing the direction of flow through the transformer 31 and actuating the magnet 38. This closes the valve 43, and opens a vent permitting the slow escape of air from the rheostat. When the normal direction of flow is restored, the switch 32 is opened and the air valve 44 is closed. It will, of course, be understood that any suitable form of reverse current switch and magnet mechanism may be employed in place of that here described.

Where transformers are interposed between the rheostat and line, as will usually be the case, a two-phase or even a single-phase connection of the secondaries may be employed, thus simplifying the rheostat. Instead of the apparatus of Fig. 5, any well known form of over-speed governing device may be employed, driven directly from the generators, or from a synchronous motor operated on circuits 1, 2, 3 and acting to connect the rheostat and to vary the resistance thereof to keep the speed below a predetermined limit. Fig. 6 shows diagrammatically such an arrangement. In this figure 60 is a governor of usual type which may or may not also be the engine governor it being only necessary that it be driven by and have a definite speed relation to the system. An arm 61 pivoted at 62 makes contact at 63 when a speed above normal is reached completing circuit of battery 64 through an electromagnet switch-closing-device 65, shown for convenience as an electromagnet, thus closing switch 32 and connecting the line wires 1, 2, 3 to rheostat 66. A resistance varying contact device 67 is arranged to be moved to vary the resistance by an electromagnetic device, shown for purposes of illustration as an electromagnet 68, which is normally controlled by a spring 69 to keep the contact device 67 in the position of maximum resistance. The device 68 is controlled by a reverse current relay 70 which acts to close the circuit of magnet 68 at contact point 71 upon a reversal of the flow of energy, being normally out of contact. When the contact 71 is closed the magnet 68 is energized and moves contact device 67 to reduce the resistance. A device, as the dash-pot 72, may be employed which permits the contact device 67 to be quickly moved to reduce resistance but to move slowly to increase it. A rotary converter or motor generator feeding storage batteries may also be employed and may be adjusted to absorb energy when the speed of the system tends to increase and to deliver energy to it when the speed tends to decrease. The connections for such an arrangement are or may be similar to those employed in a direct-current system with the exception that the direct-current side of the rotary converter is connected to the batteries only. Such connections being familiar to all those skilled in the art we do not specifically illustrate them.

Many of the details and combinations illustrated and above described are not essential to the several features of our present invention broadly considered. This will be indicated in the concluding claims, where the omission of reference to an element, or the omission of reference to the detail features of elements mentioned is intended to indicate that the omitted elements or features are not essential to the invention therein covered.

Having thus described our invention in forms at present preferred, what we claim is:

1. A power transmission system having a polyphase generating source, in combination with translating means at times consuming, and at times supplying energy, and means for absorbing energy applied to the system in excess of the demand therefor.

2. In an alternating current power transmission system, the combination of a source of polyphase current, a motor operating when driving a load to draw energy from the system and when driven by the load to return energy to it, and means for absorbing such returned energy in excess of the requirements of the system.

3. In an electric railway system the combination of a source of polyphase currents, an electrically propelled vehicle, a motor attached to said vehicle operating, when driven by the load, to return energy to said system, and means for absorbing said returned energy in excess of the requirements of the system.

4. In an alternating current power transmission system, the combination of a source of polyphase current, a motor operating when driving a load to draw energy from the system and when driven by the load to return energy to it, and automatic means for absorbing such returned energy in excess of the requirements of the system.

5. In an alternating current power transmission system, the combination of a source of polyphase current, translating devices operable therefrom, a motor operating when driving a load to draw energy from the system and when driven by the load to return energy to it, and means automatically controlled by the flow of current in the system for absorbing such returned energy in excess of the requirements of the system.

6. In an alternating current power transmission system, the combination of a source of polyphase current, translating devices operable therefrom, a motor operating when driving a load to draw energy from the system and when driven by the load to return energy to it and a rheostat for absorbing such returned energy in excess of the requirements of the system.

7. In an alternating current power transmission system, the combination of a source of polyphase current, translating devices operable therefrom, a motor operating when driving a load to draw energy from the system and when driven by the load to return energy to it, and an automatically controlled rheostat to absorb such returned energy in excess of the requirements of the system.

8. In an alternating current power transmission system the combination of a source of polyphase current, a motor operating when driving a load to draw energy from the system and when driven by the load to return energy to it and a rheostat automatically cut into circuit by the return of current to the generator for absorbing such returned energy in excess of the requirements of the system.

9. In an alternating power transmission system for railways, the combination of a source of polyphase currents, transmission circuits feeding successive sections of a railway track with current from individual phases and polyphase currents to other sections, a railway vehicle having a motor successively absorbing single-phase energy from the several sections of track, a railway vehicle having a polyphase motor operating on sections of track supplied by polyphase currents and absorbing polyphase energy when propelling the vehicle and delivering energy to the line when the vehicle speed exceeds that corresponding to the frequency of the alternating current supply, and a regulating means connected to said circuits and operating to balance and regulate said system.

10. In an alternating current power transmission system the combination of a motor operating when driving a load to absorb energy and when driven by the load to restore energy, a generator, a rheostat connected between the generator and working circuits, automatic switching devices operating to connect said rheostat to the circuit on the return of energy to the generator, and an automatic controlling device for varying the resistance of said rheostat.

11. In an alternating current power transmission system, the combination of a motor operating when driving a load to absorb energy, and when driven by the load to restore energy, a generator, a rheostat connected between generator and working circuits, means connected on the work circuit side of said rheostat for automatically connecting said rheostat to the circuit and means on the generator side for automatically increasing and decreasing the resistance of said rheostat.

12. In an electric railway system, a generator, a working circuit comprising means for operating portions of the system by single-phase current and portions by polyphase current, an induction motor operating when driving a load to absorb energy, and when driven by the load to restore energy, a rheostat connected between the generator and working circuit, automatic switching devices operating to connect the said rheostat to the working circuit on the return of energy to the generator, and an automatic controlling device for varying the resistance of said rheostat.

In testimony whereof we have signed our names to this specification in the presence of two subscribing witnesses.

LEWIS B. STILLWELL.
FRANK N. WATERMAN.

Witnesses:
W. E. RUNDLE,
F. W. NEWSON.